United States Patent [19]

Ichihashi et al.

[11] Patent Number: 4,737,801

[45] Date of Patent: Apr. 12, 1988

[54] INK SUPPLY DEVICE AND AN INK JET RECORDING APPARATUS HAVING THE INK SUPPLY DEVICE

[75] Inventors: Hiroo Ichihashi, Hiratsuka; Masakazu Ozawa, Ebina; Ryuichi Ebinuma, Hiratsuka; Atsushi Saito, Yokohama, all of Japan

[73] Assignee: Canon Kabushiki Kaisha, Tokyo, Japan

[21] Appl. No.: 886,919

[22] Filed: Jul. 18, 1986

[30] Foreign Application Priority Data

| | | | |
|---|---|---|---|
| Jul. 24, 1985 | [JP] | Japan | 60-162102 |
| Jul. 24, 1985 | [JP] | Japan | 60-162103 |
| Jul. 29, 1985 | [JP] | Japan | 60-165813 |
| Jul. 29, 1985 | [JP] | Japan | 60-165814 |
| Jul. 30, 1985 | [JP] | Japan | 60-166885 |
| Jul. 30, 1985 | [JP] | Japan | 60-166886 |

[51] Int. Cl.[4] .............................................. G01D 15/16

[52] U.S. Cl. ................................ 346/140 R; 137/392; 137/512; 138/30; 141/95; 141/198; 141/367; 251/129.17

[58] Field of Search .................. 346/140, 75; 137/392, 137/512, 854, 614.04; 141/198, 95, 94, 367, 382, 311 R; 251/129.17, 129.15; 138/30, 26; 222/325

[56] References Cited

U.S. PATENT DOCUMENTS

| | | | |
|---|---|---|---|
| 3,083,689 | 4/1963 | Hegener | 346/140 R |
| 3,184,707 | 5/1965 | Anderson | 339/186 M |
| 4,007,684 | 2/1977 | Takano | 346/140 |
| 4,144,537 | 4/1979 | Kimura et al. . | |
| 4,360,326 | 11/1982 | Buchholz | 137/854 X |
| 4,380,770 | 4/1983 | Maruyama . | |
| 4,437,105 | 3/1984 | Mrazek et al. . | |
| 4,475,116 | 10/1984 | Sicking | 346/140 |
| 4,543,589 | 9/1985 | Terasawa . | |
| 4,543,994 | 10/1985 | Johnson | 137/614.04 |
| 4,551,734 | 11/1985 | Causley | 346/140 |

FOREIGN PATENT DOCUMENTS 911265 11/1962 United Kingdom .................. 138/30

OTHER PUBLICATIONS

Baker et al.; Accumulator for Ink Supply System of an Ink Jet Printer, IBM TDB, vol. 19, No. 4, Sep. 1976, p. 1209.

Baker et al., Ink Shut-Off Valve for Ink Jet Printers, IBM TDB, vol. 21, No. 8, Jan. 1979, pp. 3266-3267.

*Primary Examiner*—Joseph W. Hartary
*Attorney, Agent, or Firm*—Fitzpatrick, Cella, Harper & Scinto

[57] ABSTRACT

An ink jet recording apparatus has a recording head for discharging ink and effecting recording, a recording flow path communicating the recording head with one end of a first ink tank, a pump side flow path communicating the first ink tank with the recording head through a pump and, together with the recording flow path, constituting an ink circulation path through the head and the first ink tank, and a secnd ink tank for supplying ink to the first ink tank. Normally open electrical opening-closing means (FIG. 11) are provided in the recording flow path and in a tube for opening the first ink tank to atmosphere. Another normally open electrical opening-closing means and a check valve permitting the passage of ink from the pump only to the recording head, this latter opening-closing means and the check valve being interposed in series in the pump side flow path between the pump and the recording head. The apparatus also may include an overflow sensor (FIGS. 9 and 10) for detecting the amount of ink that has overflowed from the first ink tank and a water hammer damper (FIG. 14) that absorbs fluid shocks in the pump side flow path. The second ink tank may have excised portions (FIGS. 15, 16 and 18) to ensure that color ink tanks are properly mounted to the apparatus.

29 Claims, 12 Drawing Sheets

INK SUPPLY DEVICE AND AN INK JET RECORDING APPARATUS HAVING THE INK SUPPLY DEVICE

BACKGROUND OF THE INVENTION

1. Field of the Invention

This invention relates to an ink supply device and an ink jet recording apparatus having the ink supply device.

2. Related Background Art

As an ink jet recording apparatus, there has heretofore been proposed one of a structure in which an ink supply path leading from an ink supply tank through a recording head back to the ink supply tank is formed and an electromagnetic valve and a pump are interposed in the intermediate portion of this supply path and the apparatus can be set to various modes by controlling them.

An example of the recording apparatus of this type according to the prior art is shown in FIG. 1 of the accompanying drawings.

In FIG. 1 which illustrates the whole of the ink supply path, reference numeral 1 designates a plurality of head elements of the type which discharges ink, for example, by the use of heat energy. The head elements have a number of nozzles and are disposed widthwisely of recording paper.

Each of the head elements 1 has two flow paths 2 and 3, one of which 2, is connected to a distributor flow path 4 and the other flow path 3 is connected to another distributor flow path 5.

The distributor flow path 4 is connected to a first ink tank 7 through a flow path 6, and an electromagnetic valve A is disposed in the intermediate portion of the flow path 6.

The other distributor flow path 5 is connected to the first ink tank 7 through a flow path 8. An electromagnetic valve C and a pump P are disposed in the intermediate portion of the flow path 8. The pump P is driven by a reversible motor M and can change over the direction of ink supply.

A liquid level sensor 9 is mounted in the first ink tank 7 to always monitor the level of ink.

The first ink tank 7 is adapted to be capable of being opened to the atmosphere through a pipe 10 and an electromagnetic valve B disposed in the intermediate portion thereof so as to keep the pressure in the tank constant.

On the other hand, a removable mounted second ink tank 12 is connected in the intermediate portion of the flow path 8 and between an electromagnetic valve C and the pump P through a check valve 11.

The example shown in FIG. 1 is shown in a state corresponding to ink of one color, but in the case of a multi-color printer, a number of such flow path systems as described above will be provided independently by colors.

Under the construction as described above, the electromagnetic valves A–C and the pump are controlled as shown in Table 1 below in accordance with respective modes.

(1) Print Mode

In this case, the electromagnetic valves A and B are opened and the electromagnetic valve C is closed. The shown example is an on-demand type ink jet printer and therefore, during the recording, no pressure is applied to ink and accordingly, the pump P is not driven. Ink is supplied to the head elements 1 through the electromagnetic valve A, the flow path 6, the distributor flow path 4 and the flow path 2.

Also, when ink flows out of the first ink tank and the interior of the tank assumes a negative pressure, air is sucked through the electromagnetic valve B and the interior of the tank is kept at a predetermined pressure.

(2) Supply Mode

In this mode, only the electromagnetic valve C is closed and the other electromagnetic valves are opened, and the pump is revolved in a forward direction and ink is supplied from the second tank 12 to the first tank 7. This mode is applied when the printer begins to be used and when the amount of ink in the first tank 7 has decreased.

(3) Pressurization Mode

This mode is applied where pressure is applied to ink to thereby force the ink out of the nozzles of the head elements and effect ink non-discharge recovery operation when the nozzles have become dry or when the nozzles are clogged.

In this mode, only the electromagnetic valve A is closed and the other electromagnetic valves are opened and the motor is revolved in the reverse direction, and the ink from the first ink tank 7 is supplied to the head elements 1 through the flow path 8, the electromagnetic valve C, the distributor flow path 5 and the flow path 3 and discharge of the ink is effected.

(4) Circulation Mode

This mode is a mode for supplying ink to each head during the initial use of the apparatus or eliminating the bubbles in the head and flow paths by circulating the ink, and is applied where the printer is left unused for a long time.

In this case, all of the electromagnetic valves are opened and the motor is revolved in the reverse direction, and ink is supplied from the tank to the head elements 1 through the flow paths 8, 5 and 3 and returns into the tank through the flow paths 2, 4 and 6.

The bubbles in the head elements or in the flow paths are collected into the first ink tank 7 and discharged into the atmosphere through the electromagnetic valve B.

(5) Preservation Mode

This mode is a mode for preventing evaporation and degeneration of the ink in the first ink tank 7 and preventing leakage of the ink, and is used during the long-time non-use of the apparatus or during the transportation of the apparatus.

In this case, all electromagnetic valves are closed and the motor is stopped, and it does not happen that due to changes in the ambient conditions (temperature, humidity, etc.), the ink in the tank leaks from the head portion or air, dust and the like enter the supply path.

TABLE 1

| | Valve A | Valve B | Valve C | Pump |
|---|---|---|---|---|
| Print | Open | Open | Close | Stop |
| Supply | Open | Open | Close | ↓ Forward |
| Pressurization | Close | Open | Open | ↑ Reverse |
| Circulation | Open | Open | Open | ↑ Reverse |
| Preservation | Close | Close | Close | Stop |

The various modes as described above can be suitably changed over to make the apparatus display its function.

However, the adoption of the above-described structure has in some cases given rise to the following problems.

First, the flow of ink is effected under the control of the electromagnetic valves A–C and the pump and therefore, the frequency of change-over of the magnetic valves and the frequency of stoppage and reversal of revolution of the pump are high, and this complicates the hardware and software of the sequence control and also requires a long time for the power supply to the electromagnetic valves, which has given rise to the problems of great power consumption and great amount of heat generation.

Also, the flow of ink is controlled by the opening-closing of the electromagnetic valves and therefore, the pressure in the flow path fluctuates each time the valves are opened and closed, and in some cases this has given rise to a problem that ink leaks from the nozzles or air is absorbed to produce bubbles.

Further, the slight overflow of ink from the flow path system and the great deal of overflow caused by an accident or the like cannot be distinguished from each other, and the apparatus cannot be set to a safe state simultaneously with the occurrence of the great deal of overflow, which has also in some cases given rise to a problem that outflow of ink arises.

Generally, an overflow sensor used to detect overflow is designed to detect an excess of the level of the liquid in a container over a predetermined set amount by electrical or mechanical detecting means.

The electrical detecting means include means utilizing the short circuiting between electrodes and means utilizing a variation in electrostatic capacity caused by the amount of liquid present between electrodes, and the mechanical detecting means include a float, a mechanical switch, etc.

However, any of the conventional overflow sensors as described above could not detect the state of overflow unless the liquid level reached the level of the detecting means.

Accordingly, for example, neither the liquid supplied little by little nor the liquid supplied in a great deal due to an accident or the like could be recognized as the state of overflow unless it was detected by the detecting means.

However, for example, when a state in which a great deal of liquid is fed to the overflow sensor side is not conceivable except in the case of an accident, if the operator waits until the liquid collects in the container and the level of that liquid is detected by the detecting means, it will delay the countermeasure for the apparatus said and will thus lead to a serious accident or trouble.

Also, in an ink jet printer or the like having a removable mounted head unit, as soon as the head unit is mounted on the body side, it must be electrically connected and also mechanically connected to a flow path system which effects circulation of ink.

A valve device provided in such a connecting portion need prevent back flow of liquid such as ink even if the pressure in the flow path system on the head unit side rises, and also the valve need be opened by all means when the head unit is mounted, and the valve need be closed by all means when the head unit is removed.

On the other hand, this valve must be of an electromagnetic valve structure in order to effect electrical control when ink-non-discharge recovery operation or the like is performed.

Where an electromagnetic valve is employed, it must be closed except when the head unit is mounted and at such time, the electric current is cut off.

Accordingly, this electromagnetic valve must be of the normally closed type structure which is always closed when an electric current is not supplied thereto.

Said valve is of a structure in which the coil is energized and the valve is opened when the head unit is connected to the body side and an electric current is supplied to the valve.

The role of the valve can be performed by the structure as described above, but in such a structure, an electric current must be supplied to the electromagnetic valve whenever the head unit is mounted.

As a result, the power consumption increases and the amount of heat generation becomes great as previously noted, and wasteful energy is consumed.

A check valve used in an ink jet recording apparatus has heretofore required a great stroke in sealing and has thus suffered from an inconvenience that it slowly responds to the mounting or dismounting of a cartridge filled with liquid and the liquid leaks from the cartridge.

Also, the valve has been of a complex structure which is provided with a slot, a cross hole, etc., and thus has led to a problem of higher cost.

In addition, for example, in ink jet printer or the like has an ink flow path system leading from an ink tank to an ink jet head, and a pump, a valve, etc., for supplying ink are disposed in the ink flow path system.

In the flow path system of such a structure, there occurs water hammer attributable to the inertia of fluid such as ink when the pump is stopped from operating or when the valve is opened and closed.

When such water hammer occurs, ink may be injected or ooze, for example, out of the nozzle of the head due to the pressure of the water hammer, thereb y staining recording paper and/or the head.

To prevent the occurrence of such water hammer, there have been proposed apparatuses in which a chamber is provided in the intermediate portion of the flow path and a body of great mass is contained in the chamber so that the pressure of water hammer is converted into the kinetic energy of this body, whereby the water hammer may be absorbed, and apparatuses of a structure in which shock means such as an accumulator is provided in the flow path system.

However, any of the conventional structures as described above has been complex and unsuitable for a small-scale flow path system of a small flow rate and high in cost.

Also, for example, in a color ink jet printer or the like, use is made of a plurality of kinds of containers called cartridges filled with different colors of inks.

These containers need be replaced with new ones when the ink therein becomes exhausted, and are removably mounted with respect to the apparatus.

Also, an ink cartridge filled with a particular color of ink is adapted to be mounted at a particular position, and if that cartridge is mounted at a different position, mixing of inks will occur.

So, cut-away portions have been formed in the fore end portion of an ink cartridge at different position correspondingly to the colors of inks and projections have been provided on the apparatus side correspondingly to the respective cut-away portions so that the ink cartridge cannot be completely mounted unless the projections are coincident with the cut-away portions.

Adoption of such a structure prevents wrong mounting of the ink cartridge.

However, adoption of the structure as described above gives rise to the following problems.

First comes the problem of a metal mold.

That is, to mold containers formed with cut-away portions at different positions, a number of containers corresponding to the kinds of containers must be prepared, and this means high cost.

There is also a method which does not use different metal molds, but uses a core to mold by a signal metal mold, whereas in this case, the core is complicated and thus, the cost becomes high as in the case where a number of metal molds are used.

Another problem is the problem in custody and handling of containers.

That is, containers differ only in the positions and shapes of cut-away portions and are of entirely the same shape in the other portions and therefore, wrong selection by the operator may occur.

Still another great problem is wrong loading of ink resulting from the above-mentioned wrong selection.

That is, in the present situation, the ink loading work is carried out without involving the automatic selection of containers and therefore, if the operator commits a mistake in selecting containers, different colors of inks will be loaded into a containers and, if such containers are mounted in the printer, it may lead to a serious accident such as mixing of inks or the recording by two or more kinds of inks of the same color.

SUMMARY OF THE INVENTION

The present invention has been made in view of the above-noted problems and an object thereof is to provide an ink supply device having a valve device in which the sequence control is remarkably simplified and power consumption is markedly decreased and the amount of heat generation is small, and an ink jet recording apparatus having such ink supply device.

Another object of the present invention is to provide an ink supply device having a check valve which prevents back flow of ink or the like even if the pressure on the head unit side fluctuates, and an ink jet recording apparatus having such ink supply device.

Still another object of the present invention is to provide an ink supply device having an overflow sensor which is free of the problem of liquid overflow not only when slight amounts of liquid have reached the overflow level in a long time, but only when a great deal of liquid is fed due to an accident or the like, and an ink jet recording apparatus having such ink supply device.

Yet still another object of the present invention is to provide an ink supply device having a water hammer absorbing damper for absorbing the pressure of water hammer if it occurs and preventing the pressure of water hammer from affecting the head side, and an ink jet recording apparatus having such ink suppy device.

A further object of the present invention is to provide an ink supply device which can realize reduced cost and can completely prevent the occurrence of an artificial mistake such as wrong selection of containers, and an ink jet recording apparatus having such ink supply device.

Still a further object of the present invention is to provide an ink jet recording apparatus provided with a head element for discharging ink and effecting recording, a recording flow path communicating said head element with one end of a first ink tank, a pump side flow path communicating said first ink tank with said head element through a pump and constituting an ink circulation path together with said recording ink flow path through said head element and said first ink tank, and a second ink tank for supplying ink to said first ink tank, characterized in that normally open electrical opening-closing means are provided in the intermediate portions of said recording ink flow path and a tube for opening said first ink tank to the atmosphere side, and a normally open electrical opening-closing means and a check valve permitting the passage of ink from said pump only to said head element are interposed in series in the intermediate portion of said pump side flow path and between said pump and said head element.

Yet still a further object of the present invention is to provide an overflow sensor characterized by the provision of a container having an air hole at a portion of the upper surface thereof, a liquid absorbing member filling said container to a predetermined level, a liquid supplying tube connected while communicating with a space above said absorbing member, and liquid level detecting means provided projectedly from the upper surface of said container toward the internal space in said container, an ink supply device having such overflow sensor, and an ink jet recording apparatus having such ink supply device.

Another object of the present invention is to provide a valve device characterized by the provision of a valve imparting a force in a direction to close a flow path, a pivotable lever imparting a force in a direction to open said valve, a solenoid for attracting said pivotable lever in a direction to close said valve by being electrically energized, and a lock lever for pivotally moving said pivotable lever in a direction to close said valve unless an extraneous force is applied thereto, an ink supply device having such valve device, and an ink jet recording apparatus having such ink supply device.

Still another object of the present invention is to provide a check valve characterized by a first valve adapted to be opened only when liquid is sucked, and a second valve adapted to be opened and closed only when a cartridge filled with liquid is mounted or dismounted and the space between said second valve and said cartridge is sealed, said first and second valves being disposed in series, an ink supply device having such check valve, and an ink jet recording apparatus having such ink supply device.

Yet still another object of the present invention is to provide a water hammer absorbing damper characterized in that a close tube resilient to such a degree as to sufficiently absorb water hammer is connected in the intermediate portion of a flow path in which water hammer occurs, an ink supply device having such water hammer absorbing damper, and an ink jet recording apparatus having such ink supply device.

A further object of the present invention is to provide an ink container having a plurality of cut-away portions formed at predetermined intervals in the peripheral wall of said container, and openings provided on the same axis at a predetermined distance from said cut-away portions along the direction in which said container is mounted, the portion of the peripheral wall which is between said cut-away portions and said openings providing an excisable portion, an ink supply device having such ink container, and an ink jet recording apparatus having such ink container.

DETAILED DESCRIPTION OF THE PREFERRED EMBODIMENT

Figure 1:
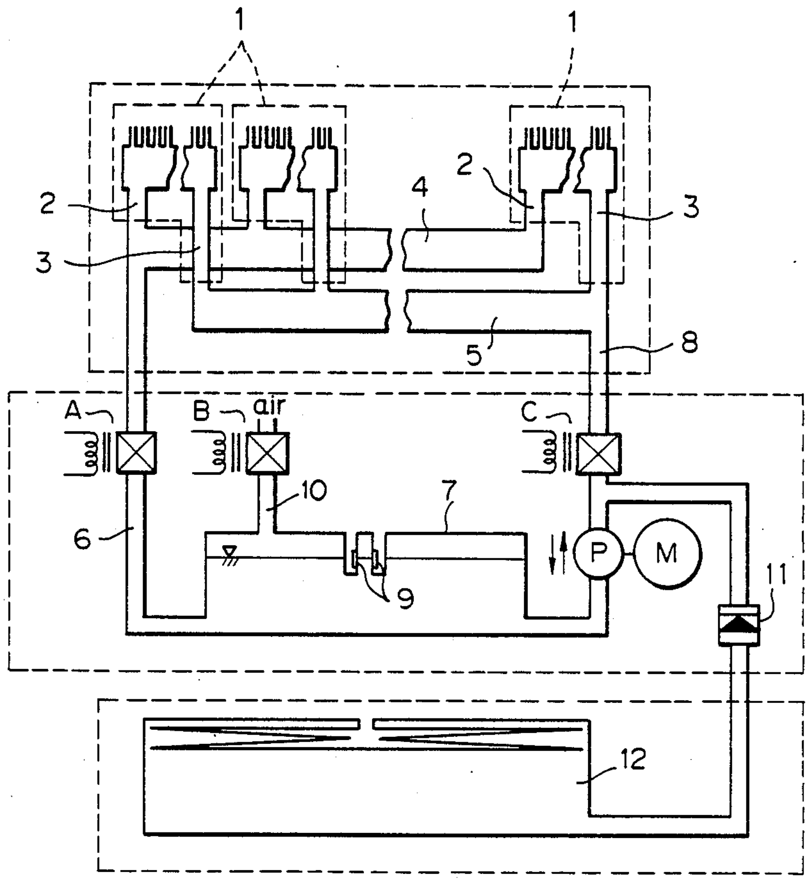
Fig. 1 PRIOR ART
FIG. 1 illustrates an example of the whole of the ink supply path in a recording apparatus according to the prior art.

The details of the present invention will hereinafter be described with respect to an embodiments thereof shown in the drawings.

In FIGS. 2 to 18 which illustrate an embodiment of the present invention, portions identical to those in FIG. 1 are given identical reference characters and need not be described. In the present embodiment, electromagnetic valves A-C are of the normally open type.

Figure 3:
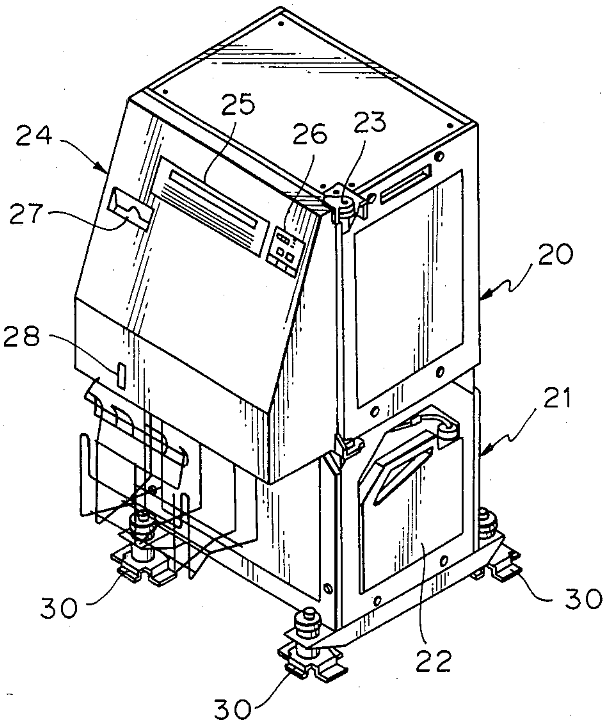
FIGS. 3 and 4 are schematic perspective views for illustrating the recording apparatus of the present invention.
Figure 4:
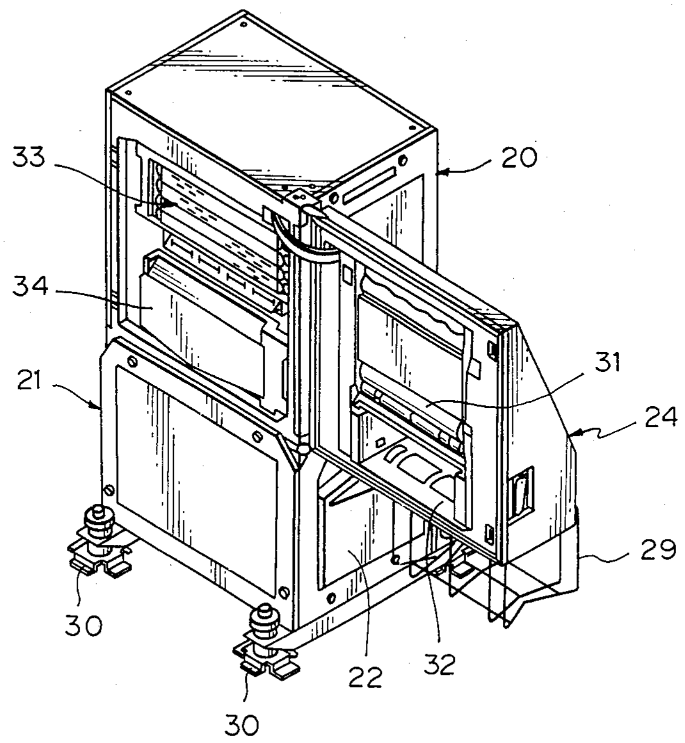

FIGS. 3 and 4 illustrate the whole of a color printer to which the present invention is applied. This color printer adopts, for example, the system which utilizes heat energy to discharge ink, and is exemplarily shown as an on-demand type printer.

In these Figures, reference numeral 20 designates an upper unit in which a head unit is contained so will be described later.

Below the upper unit 20, there is a lower unit 21 in which a power source portion is contained.

A removable drain tank 22 is mounted outside the lower unit 21 so as to be visible from outside A paper supply unit 24 is openably and closably mounted on this side of the upper unit 20 by means of a hinge 23.

A flap 25 is removably mounted on the upper portion of the front of the paper supply unit 24.

The flap 25 is a lid which covers a paper discharge port, and is adapted to be removed by the operator during the actual printing.

An operating panel 26 is provided adjacent to the flap 25.

Designated by 27 is a pocket in which a manual or the like is contained.

An opening 28 through which the amount of remaining recording paper is examined is formed in the lower portion of the front of the paper supply unit 24.

A stacker 29 formed by bending a steel wire or the like is provided on the lower portion of the paper supply unit 24.

Base units 30 are attached to the lower end of the lower unit 21.

A paper supply mechanism 31 is provided inside the paper supply unit 24, and a space 32 for containing recording paper therein is provided below the paper supply mechanism.

The upper unit 20 provides a head unit containing member, and a bubble jet assembly (hereinafter referred to as BJA) 33 is removably mounted in the upper portion thereof.

On this side of the BJA 33, a cap 34 is mounted for upward and downward movement.

Figure 5:
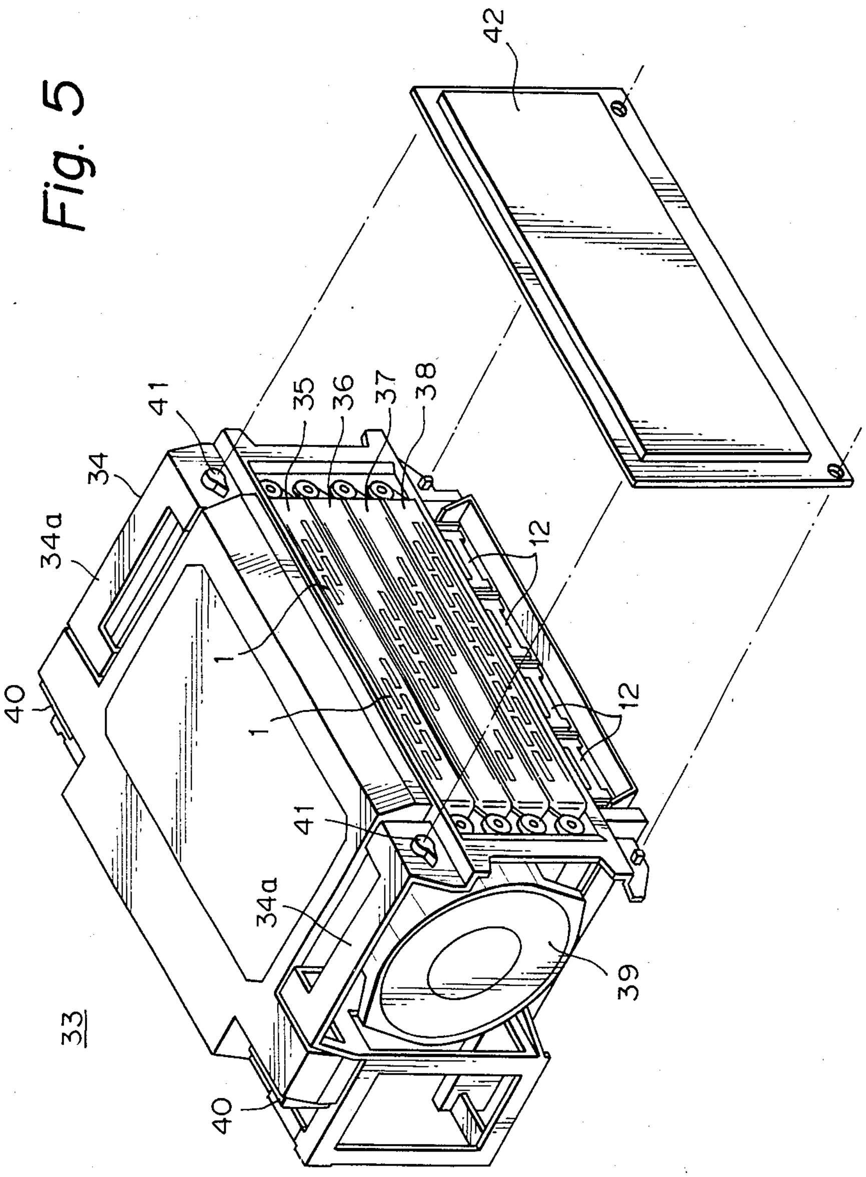
FIG. 5 is a schematic perspective view for illustrating a bubble jet assembly.

The BJA 33 is of a structure as shown in FIG. 5.

That is, the BJA 33 is assembled with a firm frame 34 as a standard and is removably mounted in the upper space of the upper unit 20.

Four bubble jet units (hereinafter referred to as BJUs) 35-38 are removably mounted on the front side of the frame 34.

In the case of the present embodiment, these BJUs 35-38 are disposed in the order of black, cyan, magenta and yellow from above.

Each of the BJUs 35-38 has a plurality of head elements 1, each of which has a number of, say, 128 nozzles (not shown).

The head elements 1 are arranged in a staggered fashion in two upper and lower stages within each BJU 35-38, while the nozzles are arranged so as not to overlap vertically.

Second ink tanks 12 filled with ink corresponding to each color are removably mounted on the lower stage of the BJUs 35-38.

The second ink tanks 12 are connected to first ink tanks 7 provided on the back side of the BJA 33, although not shown in FIG. 5.

This connection is automatically accomplished simply by mounting the second ink tanks 12.

Fans 39 for supplying cooling air are mounted on the opposite ends of the frame 34 of the BJA 33.

The BJA 33 of such a structure may be removably mounted in the upper frame 20 by grasping the right and left knobs 34*a* of the frame 34, and when thus mounted, it is automatically connected to the terminal of the power source of the upper frame 20 side through connectors 40 provided on the rear end of the frame 34.

Denoted by 41 are knobs for locking and unlocking the connectors 40.

On the other hand, designated by 42 in FIG. 5 is a cap cover mounted to cover the BJUs 35-38.

It is when the BJA is mounted or dismounted that the cap cover 42 is mounted.

That is, the cap cover 42 is mounted whenever the BJA 33 is handled, because the diameter of the nozzles formed in the head elements 1 is so small that the nozzles may be closed simply by the finger tips touching them.

Figure 6:
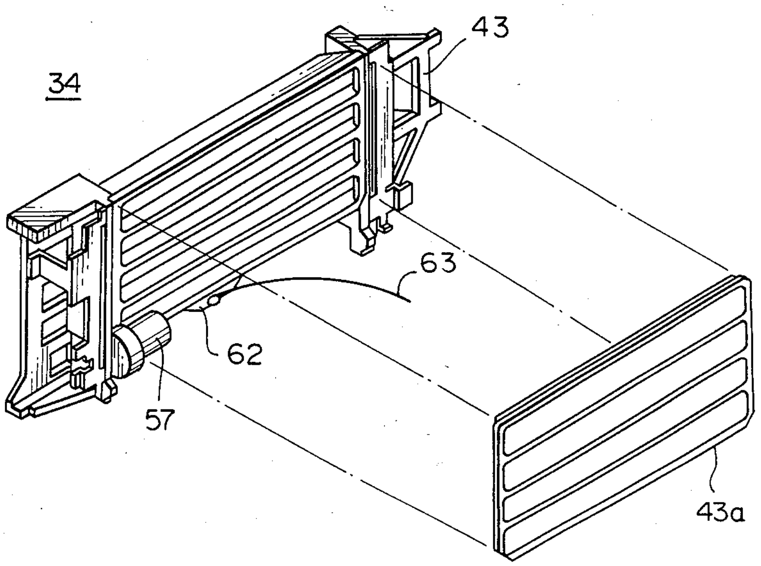
FIG. 6 is a schematic perspective view for illustrating a cap.
Figure 8:
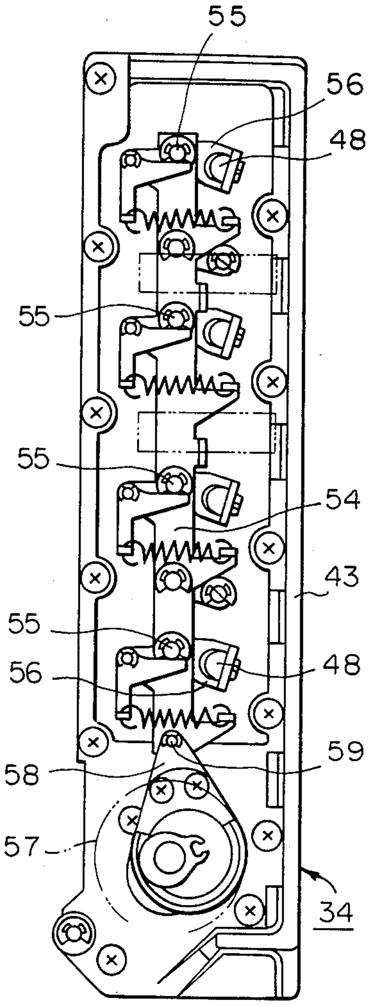
FIG. 8 is a schematic side view of the cap.

Now, the upwardly and downwardly movable cap 34 is constructed as shown in FIGS. 6 and 8.

That is, the cap 34 is assembled with a firm frame 43 as a standard and is movable upwardly and downwardly by a driver, not shown, and more particularly, movable to a position in which it covers the JBA 33 and a position completely downwardly separate from the BJA 33 as shown in FIG. 4.

Ink absorbing members 44–47 covering the respective head elements 1 of the BJUs 35–38 are contained in the cap 34.

Each ink absorbing member 44–47 is contained in a support frame 50 fixed to an arm 49 rotatably journalled to the frame 43 through a shaft 48, and below each ink absorbing member 44–47, there is disposed a throttle plate 51, which is fixed to the tip end of another arm 52.

Designated by 53 is a stopper which is contacted by the rear end of each arm 52.

A vertically upwardly and downwardly movable lever 54 is disposed on the outer side edge of the frame 43.

One end of each of four arms 56 is pivotally supported on the lever 54 by means of a pin 55 and the other ends of the arms 56 are connected to the shafts 48.

Also, the lower end of the lever 54 is rotatably supported on the tip end of a pivotable arm 58 rotated by a motor 57, by means of a pin 59.

Accordingly, when the motor 57 is revolved and the pivotable arm 58 is rotated thereby, the lever 54 is moved downwardly and the shafts 48 are rotated through the arms 56.

Figure 7:
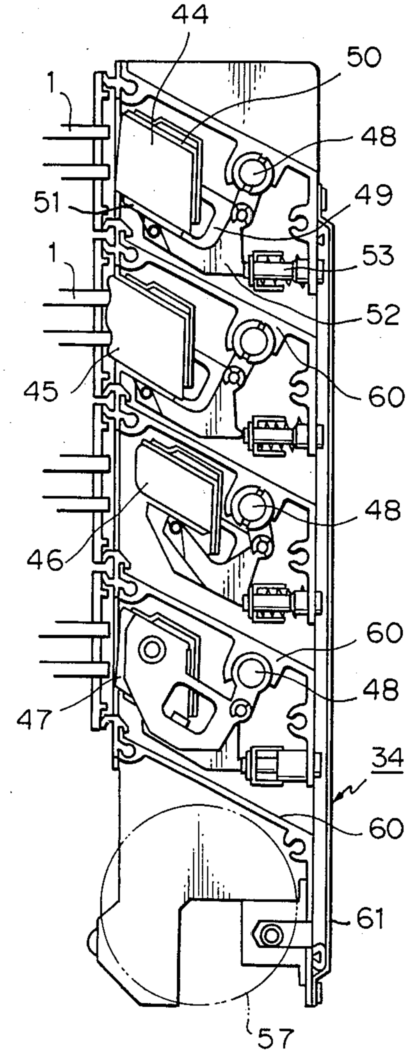
FIG. 7 is a schematic cross-sectional view of the cap.

As a result, the support frame 50 is moved downwardly through the arm 49 as shown in FIG. 7, and the arm 52 strikes against the stopper 53 and thus becomes immovable and therefore, the throttle plate 51 is moved upwardly to throttle the ink absorbing member 44.

When the lever 54 is soon moved upwardly, the original state is restored.

In FIG. 7, the various portions are shown as an irregular cross-sectionl view illustrating the movement of the absorbing member 44 sequentially from above in accordance with the lapse of time.

The ink absorbing member 44 is caused to effect an arcuate movement by pivotal movement of the arm 49 and therefore, in the course of its movement, the ink absorbing member comes into contact with the nozzle portion of the head element 1 as shown in the second stage of FIG. 7 from above and absorbs ink, and the ink thus absorbed is squeezed.

On the other hand, the ink absorbing members 4447 are contained in elongated chambers partitioned by inclined partition plates 60 as shown in FIG. 7, and at the lower ends of the partition plates 60, a cover 61 is fixed to the outer side of the frame 43.

A flat surface formed by this cover 61 provides a path along which the squeezed ink moves down, and the ink gathers into the lowermost ink reservoir designated by 62 in FIG. 6 and is directed into a drain tank 22 through a tube 63. Designated by 43*a* in FIG. 6 is a cover for a cap.

The outline of the ink flow path in the printer having the construction as described above is shown in FIG. 2.

Figure 2:
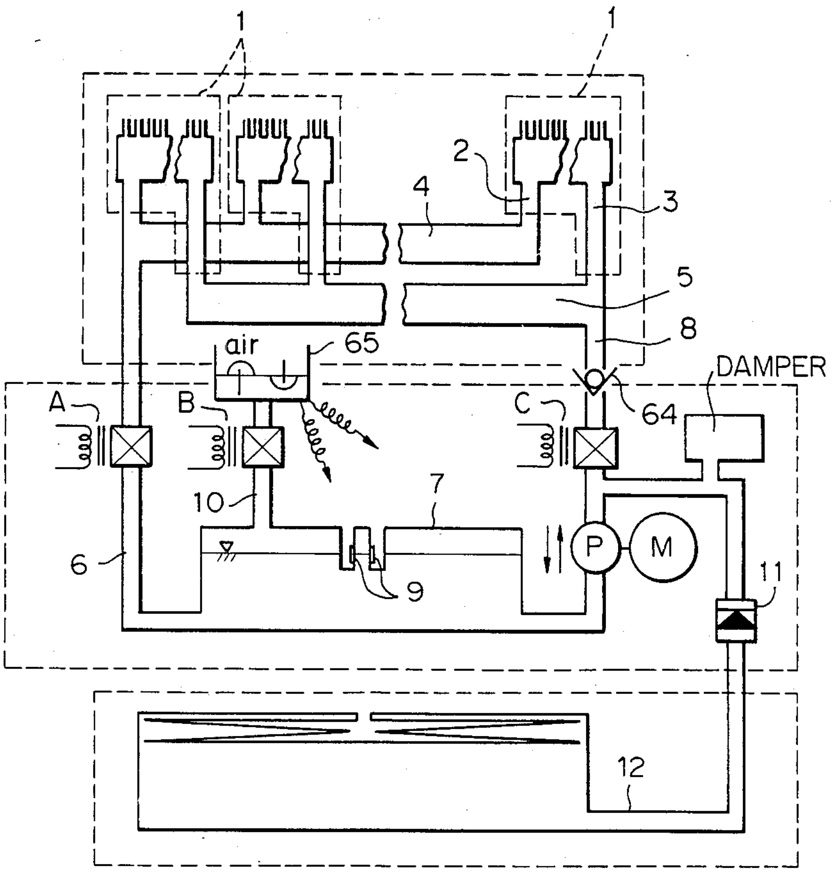
FIG. 2 illustrates an embodiment of the whole of the ink supply path in the recording apparatus of the present invention.

In the embodiment shown in FIG. 2, as is apparent from the comparison with FIG. 1, a check valve 64 is provided in a flow path 8 linking the head elements to the pump side. This check valve 64 is of a structure which permits the passage of ink to the head elements 1.

Also, an overflow sensor 65 serving also as a breather is mounted on the end of a tube 10 which is adjacent to the atmosphere-open side through the electromagnetic valve B of the first ink tank 7.

Figure 11:
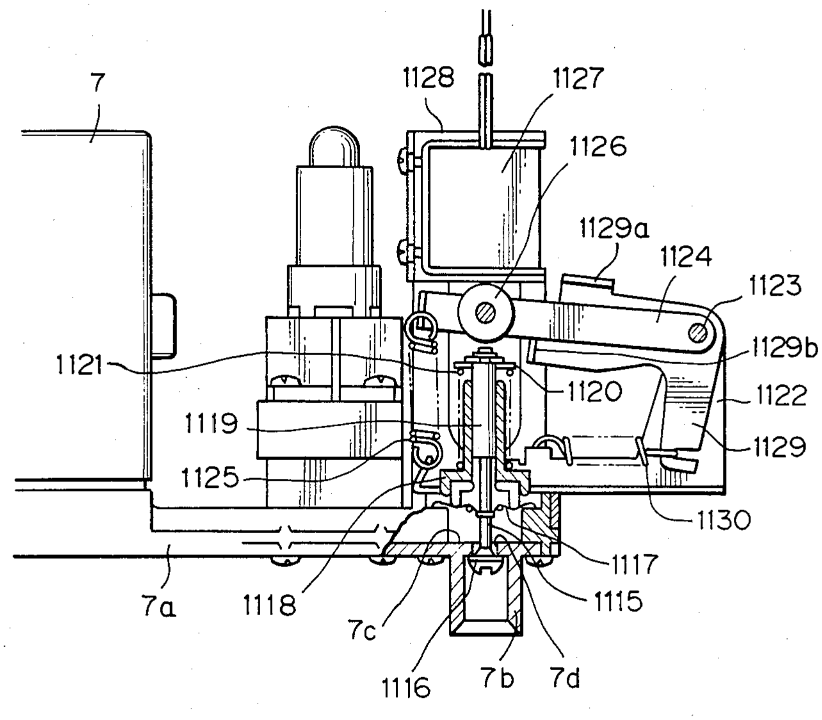
FIGS. 11 and 12 are a schematic cross-sectional view and a schematic plan view, respectively, for illustrating the electromagnetic valve of the present invention.
Figure 12:
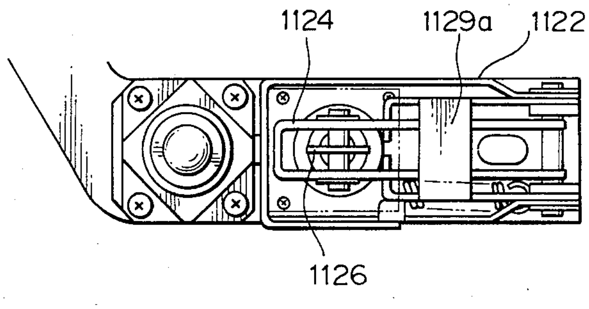

On the other hand, the structure of electromagnetic valves A-C used in the above-described flow path system is shown in FIGS. 11 and 12.

A connecting cylinder 7*b* extending toward the body side is provided on an arm 7*a* extending from each of the opposite sides of the first ink tank 7, and this connecting cylinder 7*b* is connected to the valve of the body, not shown.

A valve rod 1115 is slidably fitted in a through-hole 7*d* which communicates the connecting cylinder 7*b* which communicates the connecting cylinder 7*b* with an ink flow path 7*c* formed in the arm 7*a*.

A valve 1116 is fixed to the end of the valve rod 1115 which is adjacent to the connecting cylinder 7*b*, and the intermediate portion of the valve rod 1115 is supported by a diaphragm 1117.

The diaphragm 1117 is fixed by being nipped between a guide cylinder 1118 extending to the opposite side to the connecting cylinder 7*b* and the arm 7*a*, so that ink may not leak toward the guide cylinder 1118.

A rod 1119 intergral with the valve rod 1115 is slidably fitted in the guide cylinder 1118.

A spring 1121 is resiliently provided between a spring bearing 1120 fixed to the upper end of the rod 1119 and the base of the guide cylinder 1118 to normally bias the rod 1119 and the valve rod 1115 upwardly and close the through-hole 7*d* by the valve 1116 so that ink may not be directed toward the connecting cylinder 7*b*.

On the other hand, a support frame 1122 formed by a metal plate or the like and surrounding the connecting cylinder 1118 extends from one end of the arm 7*a*, and one end of a pivotable lever 1124 is pivotally supported on the outer and upper end of the support frame 1122 by means of a shaft 1123.

The free end of the pivotable lever 1124 extends through the outside of the rod 1119, and a spring 1125 is provided between said free end and the arm 7*a*.

A disc 1126 which is in contact with the rod 1119 is mounted on the intermediate portion of the pivotable lever 1124.

Accordingly, the pivotable lever 1124 is normally biased downwardly as viewed in FIG. 11 by the spring 1125 and is given a force in a direction to press the rod 1119 through the intermediary of the disc 1126.

It should be noted that the tension of the spring 1125 is greater than the resilient force of the spring 1121.

Above the pivotable lever 1124, a solenoid 1127 is fixed to a portion of the support frame 1122, and the yoke 1128 thereof is situated above the pivotable lever 1124.

The pivotable lever 1124 is formed into an elongated U-shape from an iron plate or the like as shown in FIG. 12, and when the solenoid 1127 is energized, the pivotable lever 1124 is pivotally moved against the tension of the spring 1125 and attracted toward the yoke 1128.

Now, a lock lever 1129 is pivotably supported on the support frame 1122 coaxially with the pivotable lever 1124 through a shaft 1123.

The lock lever 1129 is substantially L-shaped and the horizontal portion thereof extends along the pivotable lever 1124 in such a manner as to surround the pivotable lever 1124.

This lock lever 1129 has a connecting piece 1129*a* above the pivotable lever 1124 and has a connecting piece 1129*b* below the pivotable lever 1124.

A spring 1130 is provided between the lever end of the vertical portion of the lock lever 1129 and a portion of the support frame 1122 which is adjacent to the guide cylinder 1118, and the lock lever 1129 is given a clockwise rotational force as viewed in FIG. 11.

The tension of this spring 1130 is greater than the tension of the aforementioned spring 1125.

Accordingly, as long as an extraneous force is not applied to the lock lever 1129, the lock lever 1129 is pivotally moved clockwise as viewed in FIG. 11 by the tension of the spring 1130 and the lower connecting piece 1129*b* thereof pushes the pivotable lever 1124 upwardly, whereby the disc 1126 is separated from the rod 1118.

That is, the lock lever 1129 performs the function of holding the valve 1116 in its closed state by the force of the spring 1121.

Now, the first ink tank 7 is fixed to the head unit side with such an electromagnetic valve mounted, and the valve 1116 is in its closed state without fail before the head unit is mounted on the body side or after the head unit is removed from the body side.

As soon as the head unit is mounted on the body side, the projection, not shown, of the body side pivotally moves the lock lever 1129 counter-clockwise as viewed in FIG. 11 and therefore, the restraining force on the pivotable lever 1124 becomes null and the pivotable lever 1124 is pivotally moved counter-clockwise, and thus the rod 1119 is pushed to thereby open the valve 1116.

Also, if the head unit is removed, the lock lever 1129 will be pivotally moved clockwise as viewed in FIG. 11 and the pivotable lever 1124 will separate from the rod 1119 to thereby close the valve 1116.

In this manner, the operation of opening the valve simply by mounting the head unit and closing the valve simply by removing the head unit can be mechanically accomplished without requiring electrical energy or the like.

Also, to control the flowing condition of ink or the like, if an electric current is flowed to the solenoid 1127 with the head unit being mounted, the pivotable lever 1124 will be attracted toward the yoke 1128 against the tension of the spring 1125 and the rod 1119 will be pushed upwardly as viewed in FIG. 11 by the resilient force of the spring 1121, whereby the valve 1116 will be closed.

That is, in the present invention, in order to simplify the sequence control and prevent the adverse effect on the head side, a check valve permitting the passage of ink only toward the head is provided in series with an electromagnetic valve in the intermediate portion of the ink flow path linking the head elements to the pump and the electromagnetic valve is of th normally open type.

Thus, there is obtained an electromagnetic valve to which power supply may be effected only when required and which consumes a small amount of electric power and generates a small amount of heat.

Also, even if the pressure on the connecting cylinder *7b* side becomes higher when electric power is supplied to the solenoid and the valve is closed, the valve 1116 will only increase its force in the direction to be closed and no back flow to the ink tank 7 side will occur.

Further, if there is a rise of the pressure in the ink tank 7 due to the expansion or the like of the air in the ink tank, the pressure on the diaphragm 1117 side will be applied and a force in the direction to seal the valve 1116 will be applied to the valve 1116 and thus, the leakage of ink by the pressure increase will not occur.

Also, an overflow sensor which will not respond to the overflow of a small amount of ink but will immediately respond only to the overflow of a great amount of ink is provided as a countermeasure to overflow.

Figure 9:
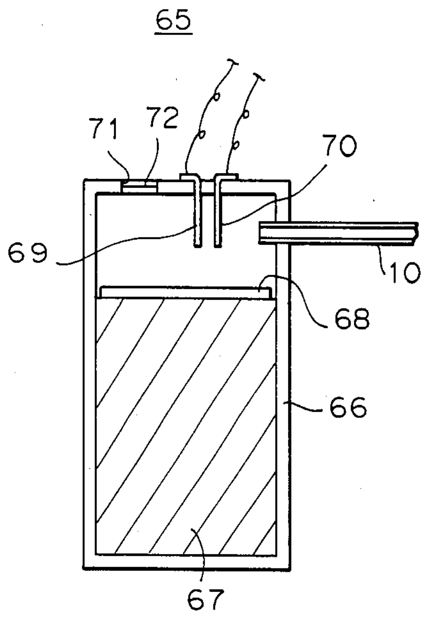
FIGS. 9 and 10 are a schematic cross-sectional view and a schematic perspective view, respectively, for illustrating an embodiment of the overflow sensor of the present invention.
Figure 10:
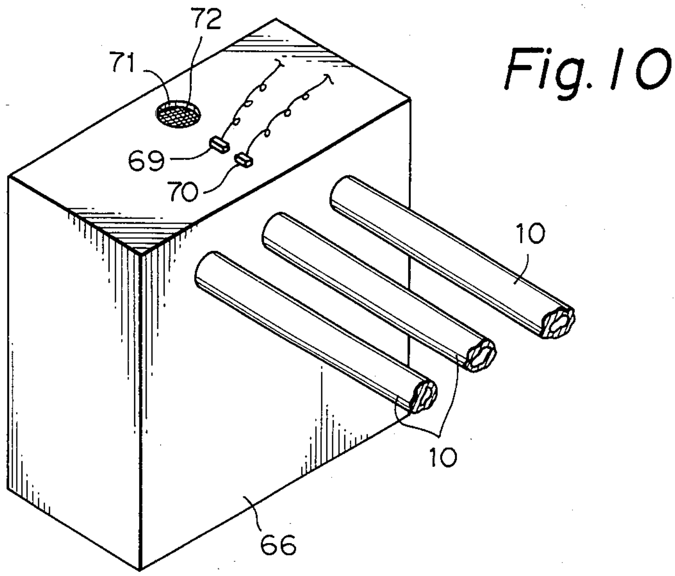

A preferred embodiment of the overflow sensor 65 is of such a structure as shown in FIGS. 9 and 10.

As shown in the schematic cross-sectional view of FIG. 9, this overflow sensor 65 has a container 66 of a predetermined shape which is filled with an ink absorbing member 67 having a predetermined volume.

The other end of a tube 10 extending from the first ink tank 7 is connected to the space above the absorbing member 67.

That is, in the present invention, in order to solve the above-noted problems, a structure is adopted in which the container connected to the tube through which liquid is directed is filled with an ink abosrbing member and liquid level detecting means and atmosphere opening means are provided in the upper space in the container.

A trap lid 68 is placed on the upper surface of the ink absorbing member 67, but this may be omitted.

Also, a pair of electrodes 69 and 70 are projected by a predetermined distance from the upper end of the container 66 toward the interior thereof (in FIG. 9, they are shown as being vertically inserted).

An air hole 71 is formed in the upper end of the container 66, and a breather film 72 for absorbing (introducing) the air into the container 66 when the pressure in the container 66 becomes lower than a predetermined level and discharging the air out of the container 66 when the pressure in the container 66 becomes higher than the predetermined level is provided across the air hole 71.

This breather film is for adjusting the pressure in the air chamber in the first tank communicating with the container through the tube 10.

The overflow sensor adopting such a structure has the following function.

Ink sometimes comes out of the tube 10 by a minute amount due to the fluctuation of the pressure in the flow path when the apparatus is not out of order.

Such a minute amount of overflowing ink drops onto the trap lid 68 and is absorbed into the absorbing member 67 through the gap between the trap lid 68 and the inner wall of the container 66.

Accordingly, the substantial liquid level does not rise and the electrodes 69 and 70 are not short-circuited therebetween.

Of course, if the liquid level rises to such a degree as to short-circuit the electrodes 69 and 70 in a long time, it can be immediately detected and a warning can be given or a measure to the apparatus side, such as stoppage of the operation, can be effected.

However, if some trouble occurs and a great amount of overflowing ink is discharged from the tube 10, the ink will collect on top of the trap lid 68 earlier than the ink is absorbed into the absorbing member 67 through the gap between the trap lid 68 and the inner wall of the container, and the substantial liquid level will rise and the electrodes 69 and 70 will be short-circuited and therefore, the overflow state can be immediately detected and the pump or the electromagnetic valve can be stopped or closed, whereby the overflow accident can be interrupted at its early stage.

As a result, the occurrence of the overflow due to an accident or the like can be detected at the early stage of the great amount of overflow and an emergent step such as stoppage of the apparatus can be taken.

The above-described overflow sensor, if provided in a portion of the ink flow path system of an ink jet printer, for instance, can early detect a great amount of ink overflow and prevent the recording paper and/or the apparatus from being contaminated by the ink, and this is very effective.

Where the pressure in the container 66 changes, air goes into and out of the container with the aid of the presence of the breather film 72 in conformity with the pressure and thus keeps the pressure in the container always at a constant level, and the adverse effect by the fluctuation of the pressure is not imparted to the apparatus through the tube 10.

The above-described embodiments adopts the trap lid 68, whereas this trap lid 68 is not always necessary as previously described. But where the trap lid 68 is not provided, care must be taken in choosing the material of the liquid absorbing member 67 and making the liquid absorption factor optimum in accordance with the kind of the liquid. This is also necessary to eliminate a case where too good an absorption factor prevents the operation from being stopped at the early stage of overflow or a case where too bad an absorption factor causes the liquid to overflow from the container even if it barely permits the operation to be stopped at the early stage of overflow. It is also preferable that the volume of the space above the absorbing member 67 and the spacing between the absorbing member 67 and the electrodes 69, 70 be set in conformity with the absorption factor.

Figure 13:
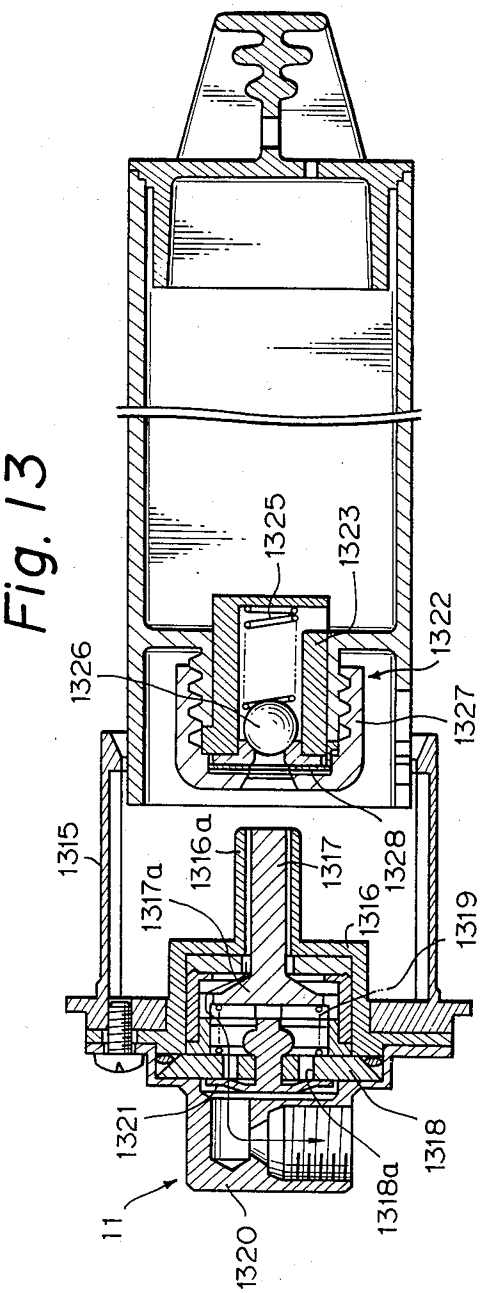
FIG. 13 is a schematic cross-sectional view for illustrating an embodiment of the check valve of the present invention.

FIG. 13 is a schematic cross-sectional view for illustrating a preferred embodiment of the check value of the present invention.

Designated by 1315 in FIG. 13 is a guide frame fixed to the body on which the head unit is mounted. A second ink tank (cartridge) 12 is fitted in the guide frame 1315.

A cylindrical member 1316 is fixed by being surrounded by the guide frame 1315.

This cylindrical member 1316 has a small-diametered portion **1316*a* toward the entrance of the guide frame 1315**.

A valve (a second valve) 1317 is slidably fitted in the small-diametered portion 1316.

At the end of the valve 1317, a large-diametered valve head **1317*a* is formed within the cylindrical member 1316, and a spring 1319 is resiliently disposed between the valve head 1317*a* and a partition plate 1318** to be described.

On the other hand, in opposed relationship with the cylindrical member 1316 and on the opposite end of the guide frame 1315, a connecting member 1320 to which one end of a tube constituting an ink flow path is provided and fixed to the guide frame 1315 with the partition plate 1318 interposed therebetween.

The partition plate 1318 is formed with a plurality of through-holes **1318*a***.

A diaphragm valve (a first valve) 1321 is disposed between the partition plate 1318 and the connecting member 1320 to normally close the through-holes **1318*a* in the partition plate 1318**.

The valve 1317 is normally closed by the force of the spring 1319 which is a resilient member before the cartridges is mounted.

On the other hand, the second ink tank 12 which is a cartridge has a valve device 1322 at its end as shown in FIG. 13.

This valve device 1322 comprises a cylindrical member 1323 and a ball 1324 contained therein, the ball 1324 being pressed toward the fore end by a spring 1325 and urged against a valve seat 1326.

The valve seat 1326 is fixed to the cylindrical member 1323 by a cap 1327.

The cap 1327 and the valve seat 1326 are formed with an opening in which the small-diametered portion **1316*a* of the cylindrical member 1316 is fitted, and a seal member 1328 is nipped between the cap 1327 and the valve seat 1326**.

That is, the present invention adopts, in order to solve the above-noted problems, a structure in which a valve adapted to open only when liquid is sucked from within the connected cartridge and a valve adapted to open only when the cartridge is mounted are arranged in series.

The operation of the check valve designed as described above will now be described.

When the second ink tank 12 which is a cartridge is mounted into the guide frame 1315, the small-diametered portion **1316*a* first enters the valve device 1322 through the opening in the cap 1327 and at first, the small-diametered portion 1316*a* is sealed by the seal member 1328**.

Subsequently, the ball 1324 pushes the valve 1317 slightly protruding from the small-diametered portion **1316*a***.

Thereupon, the valve 1317 compresses the spring 1319 and is opened thereby and thus, the flow path to the ink tank side is connected.

The ball 1324 strikes against the small-diametered portion **1316*a* and is pushed thereby and thus, the valve device 1322** becomes open.

In this state, a pump P which is in communication with the ink tank side and the body side is driven and ink is sucked, whereupon the diaphragm valve 1321 is opened and ink is sucked.

As long as the suction by the pump or the like is not effected, the diaphragm valve is always closed to prevent the back flow of ink.

When the ink tank 12 is to be replaced with another one, it is pulled out of the guide frame 1315, and at this time, the valve 1317 is first closed in accordance with the withdrawal of the ink tank.

In this state, the small-diametered portion **1316*a* is sealed by the seal member 1328** and therefore, leakage of ink does not occur.

Thus, ink does not leak when the ink tank which is a cartridge is mounted or dismounted.

Although the above-described embodiment has been shown as an example applied to an ink jet printer, the present invention is not restricted to the ink jet printer, but is applicable to any apparatus in which a cartridge filled with liquid is mounted and dismounted.

Figure 14:
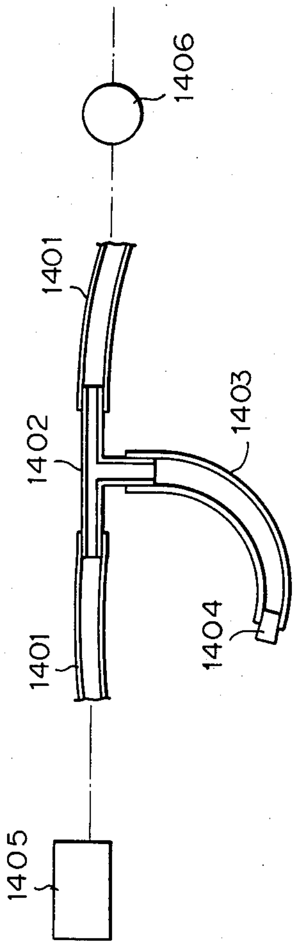
FIG. 14 is a schematic cross-sectional view for illustrating an embodiment of the water hammer absorbing damper of the present invention.

FIG. 14 is a schematic cross-sectional view illustrating a preferred embodiment of a water hammer absorbing damper in the present invention. Designated by 1401 in FIG. 14 is a tube constituting a flow path of fluid such as ink. This tube 1401 is severed at its intermediate portion, to which a T-tube 1402 is connected.

A predetermined length of resilient tube 1403 is connected to the T-tube 1402.

The free end of the tube 1403 is closed by a plug 1404.

One end of the tube 1401 is connected to an ink tank 1405 and the other end thereof is connected to a pump 1406.

Also, a head is connected to the tank 1405.

That is, in order to solve the above-noted problems, the present invention adopts a structure in which a resilient tube branching off from the liquid flow path is provided at the intermediate portion of the liquid flow path.

With the above-described construction of the present embodiment, if water hammer occurs when the pump 1406 is stopped from operating, the water hammer pressure will be directed toward the resilient tube 1403 and this tube will expand to thereby absorb the water hammer pressure.

The length of the resilient tube 1403, with the diameter thereof, is determined with expected water hammer pressure being taken into account.

In the above-described embodiment, the resilient tube 1403 is connected through the T-tube 1402, but alternatively, it may directly branch off from the tube 1401.

Operation of the present embodiment constructed as described above will now be described.

When the apparatus is preserved for a long period of time or before it is carried to the user and set, the BJA 33 remains removed from the upper unit of the apparatus.

When the BJA 33 is in its removed state, all electromagnetic valves A–C are in their mechanically closed state and the connector 40 is also separated and therefore, the electric current to the motor is cut off and the pump is stopped from operating.

On the other hand, when the BJA 33 is contained in the upper unit 20, the electromagnetic valves A–C are automatically and mechanically opened to thereby form their respective flow path systems.

However, the pump remains stopped.

In this state, the apparatus assumes its standby state.

The states of the electromagnetic valves and pump in the above-described respective states are shown in the upper columns of Table 2 below.

TABLE 2

| | A | B | C | Pump |
|---|---|---|---|---|
| BJA off | C | C | C | Stop |
| BJA set | O | O | O | Stop |
| Print | O | O | O | Stop |
| Supply | O | O | O | Forward revolution |
| Circulation | O | O | O | Reverse revolution |
| Pressurization | C | O | O | Reverse revolution |

(C → Closed, O → Opened)

Also, the states of the electromagnetic valves and pump during the various operations described hereinbelow are shown in the lower columns of Table 2.

The operations in respective modes will hereinafter be described by reference to Table 2.

(1) Circulation mode

This mode is a mode used where ink is supplied to each head element 1 or bubbles in the head elements or the ink flow path are eliminated and at the same time the ink in them is refreshed when the apparatus is placed in its standby state as previously described.

In this state, all electromagnetic valves are opened as shown in Table 2, the cap 34 is moved up to cover the front face of the BJA33, and the ink absorbing members 44–47 are urged against the respective head elements 1.

In this state, the pump P revolves in the reverse direction, the ink is sucked from the first ink tank 7 passes through the flow path 8 via the electromagnetic valve C and the check valve 64, and is supplied to the head elements 1 through the distributor flow path 5 and the flow path 3 to force the ink out of the nozzles, and also passes through the flow path 6 in which the electromagnetic valve A is disposed, via the flow path 2 and the distributor flow path 4, and returns to the first ink tank 7.

By this return of ink, the head elements are supplied with ink and the bubbles in the head and the ink flow paths are collected into the first ink tank 7 and directed from the upper air chamber through the tube 10 and the electromagnetic valve B to the overflow sensor 65 which serves also as a breather, and are discharged outwardly from the air hole 71.

(2) Print Mode

This mode is a mode for supplying the ink necessary for recording from the first ink tank 7 to the head elements 1, and in this mode, all electromagnetic valves are opened and the pump is stopped, as shown in Table 2.

Since the ink jet printer in the present embodiment is of the on-demand type, no pressure is applied to ink during the recording and accordingly, the pump is not driven.

In this mode, the head element side assumes negative pressure in response to the discharge of ink from the head elements 1 and therefore, ink passes through the electromagnetic valve A via the flow path 6 and is supplied to the head elements 1 through the distributor flow path 4 and the flow path 2, whereby the recording based on the recording instructions is effected.

(3) Supply Mode

This mode is a mode for supplying ink from the second ink tank 12 to the first ink tank 7, and is applied when the apparatus starts to be used and when the amount of ink in the first ink tank is reduced.

In this mode, all electromagnetic valves A–C are opened and the pump is revolved in the forward direction, as shown in Table 2.

Therefore, the ink from the second ink tank 12 is supplied into the first ink tank 7 through the check valve 11 and the pump P and thus, the liquid level rises.

Even if pressure is applied to ink by the pump P at this time, return of ink will not occur because the check valve 64 is disposed in series with the electromagnetic valve C.

Again at this time, the cap 34 is moved up and the absorbing members 44–47 are urged against the head elements 1.

(4) Pressurization Mode

This mode is a so-called non-discharge recovery mode for applying pressure to ink to thereby force the ink out of the nozzles and eliminate the non-discharge state of the ink when the ink in the nozzles has become dry or when the nozzles are clogged.

In this case, only the electromagnetic valve A is closed, while the other electromagnetic valves are opened and the pump is revolved in the reverse direction.

At this time, the ink in the first ink tank 7 passes through the flow path 8 via the pump P, the electromagnetic valves C and the check valve 64, and is supplied to the head elements 1 through the distributor flow path 5 and the flow path 3.

The electromagnetic valve A is closed at this time and therefore, return of ink does not occur, but ink is directed to the nozzles of the head elements and injected from the nozzles to thereby eliminate the clogging of the nozzles.

Of course, again at this time, the cap 3 is moved up and the absorbing members 44–47 are urged against the head elements 1.

Now, the printer can be made to function by the various states or modes of the apparatus as shown in Table 2 and moreover, the printer shown in the present embodiment has the following functions.

That is, one of the functions is that when the liquid level does not rise in the aforedescribed supply mode, the ink in the second ink tank 12 becomes exhausted and therefore the ink end of the second ink tank 12 can also be detected.

Also, even if the ink in the second ink tank 12 becomes exhausted, a certain degree of ink is preserved in the first ink tank 7 and therefore, interruption of the print out during the replacement of the second ink tank 12 does not occur.

Also, by the presence of the aforedescribed overflow sensor 65, the necessary portions of the apparatus can be immediately stopped to thereby obviate any serious trouble even when a great amount of overflow occurs.

The ink container of the present invention suitably usable, for example, as the second ink tank will hereinafter be described with respect to a preferred embodiment thereof shown in FIGS. 15 to 18.

The ink container designated by 1501 in these Figures is exemplarily shown as an ink cartridge and is formed as an elongated, flat, hollow container.

A handle 1502 for use during the mounting and dismounting is integrally provided on one lengthwise end of the ink container 1501, and a peripheral wall 1503 is integrally and projectedly provided over a predetermined length on the other end of the ink container.

An ink pouring and discharging valve 1504 surrounded by the peripheral wall 1503 is provided.

Figure 15:
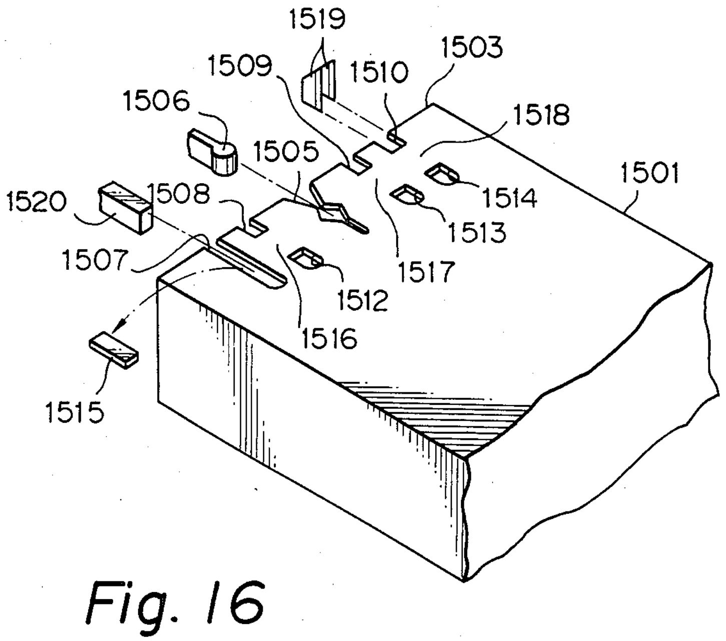
FIGS. 15-17 show the ink container of the present invention.

On the other hand, some portions of the peripheral wall 1503 are utilized to form such cut-away portions as shown in the schematic perspective view of FIG. 15 which shows the essential portions of the ink container.

That is, a cut-away portion 1505 is formed centrally of the peripheral wall 1503 on one of the upper and lower sides of the ink container 1501.

This cut-away portion 1505 is wider at the entrance and becomes narrower inwardly and again becomes wider.

A container fixing projection 1506 provided on the apparatus side is fitted in this cut-away portion.

The projection 1506 is substantially cylindrical and the diameter thereof is larger than the intermediate reduced portion of the cut-away portion 1505, and when fitted into the cut-away portion 1505, the projection 1506 holds the ink container 1501 so that the latter cannot be drawn out unless a great force is applied to the ink container 1501.

Also, at the opposite sides of the cut-away portion 1505, each two quadrilateral cut-away portions 1507–1508 and 1509–1510 are formed symmetrically in the peripheral wall 1503, and correspondingly to these cut-away portions 1507–1510, openings 1511–1514 are formed in the peripheral wall 1503 at locations toward the inner part thereof.

Excisable portions 1515–1518 are formed between the cut-away portions 1507–1510 and the openings 1511–1514 opposed thereto.

That is, in order to solve the above-noted problems, the present invention adopts a structure in which during the molding, the ink container is formed just in the same shape, but a plurality of excisable portions are provided in some portions of the ink container.

The usage of the ink container of the present invention constructed as described above will now be described.

The ink containers 1501 are molded by the use of the same kind of metal mold with the cut-away portions 1507–1510 and the openings 1511–1514 being formed in some portions of the peripheral wall 1503 as shown in FIG. 15.

Figure 16:
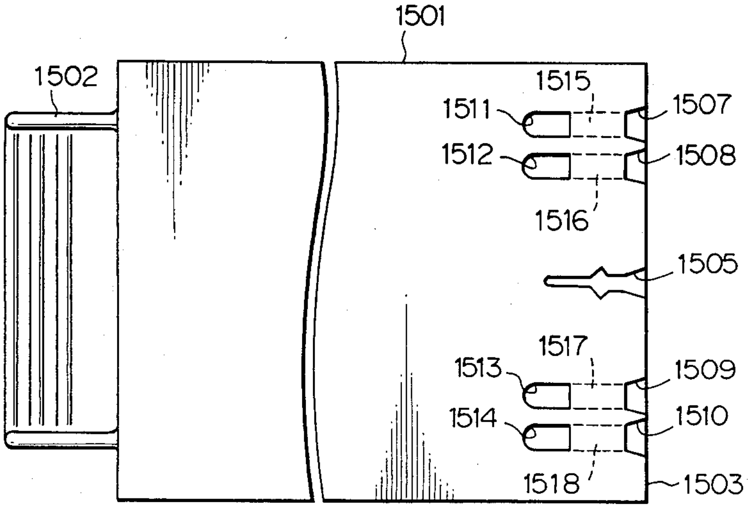

In the molded state of the ink containers, all excisable portions 1515–1518 are left as shown in the schematic plan view of FIG. 16.

Accordingly, all the ink containers are identical and the operator need not make an effort to distinguish between them.

On the other hand, when the ink container is to be filled with ink, if the ink container 1501 is mounted on the ink loading device side, a pair of cutters 1519 and 1519 is provided correspondingly on one of the excisable portions 1515–1518 predetermined in conformity with the color of the ink.

These cutters 1519 and 1519 are disposed at an interval equal to the width of the cut-away portions 1507–1510 as shown in FIG. 15.

Accordingly, a particular excisable portion is cut as shown in FIG. 15 simply by mounting the ink container 1501 on the ink loading device side.

Figure 17:
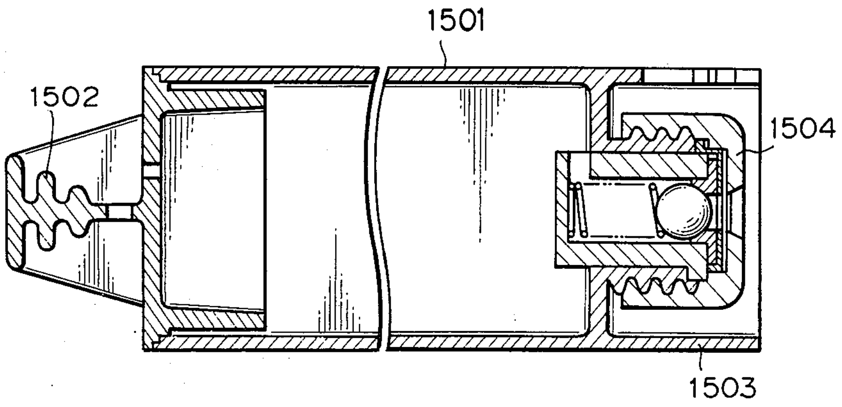
Figure 18:
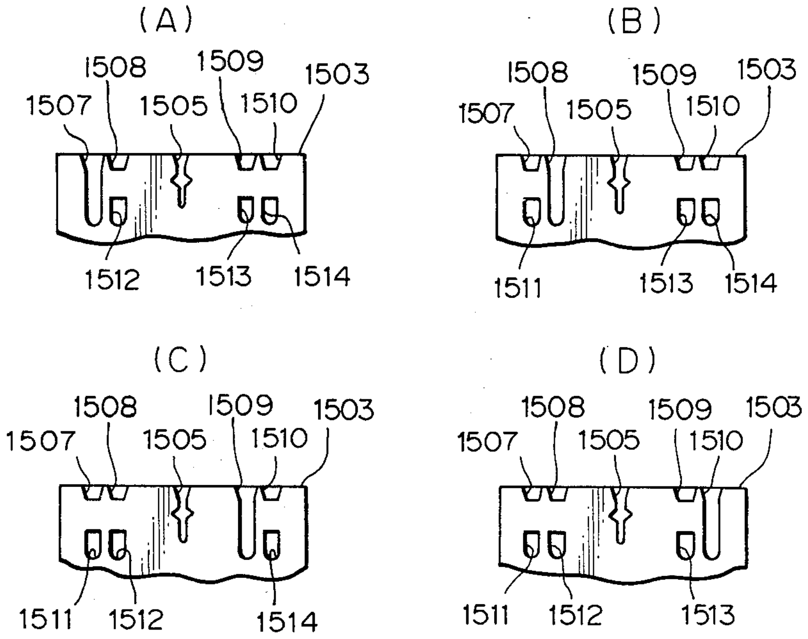
FIGS. 18(A)-(D) are schematic fregmentary plan views for illustrating the ink containers of the present invention.

Simultaneously with this cutting work, ink is loaded from the ink loading device, not shown, into the ink container through the valve 1504 shown in the schematic cross-sectional view of FIG. 17.

That is, excision of a particular excisable portion corresponding to the color of particular ink and loading of ink of a particular color take place at a time and thus, selection of a container need not be done.

On the other hand, a projection 1520 is provided on the apparatus side correspondingly to the excised portion of the container which has been filled with ink.

This projection 1520 is provided in opposed relationship with one of the particular cut-away portions 1507–1510 which has been excised to provide a continuous cut-away portion.

Accordingly, unless the particular projection 1520 and the particular excised cut-away portion do not correspond to each other, the ink container 1501 cannot be mounted completely, but the mounting will be hampered by one of the remaining excisable portions 1515–1518.

In the manner described above, there can be provided a container which will not be erroneously inserted and erroneously used during the processes including the container manufacturing process, the ink loading process and the handling on the part of the user.

Examples applied to ink cartridges of four colors are shown in the schematic fragmentary plan views of FIGS. 18(A)–(D).

FIGS. 18(A)–(D) show examples of the formation of cut-away portions corresponding to yellow, magenta, cyan and black in succession from above.

In the above-described embodiment, an example has been shown in which the cut-away portions and excisable portions are formed only in one side of the peripheral wall of the container, but alternatively, the cut-away portions and excisable portions may be formed in the upper and lower surfaces of the container or in one or both of the right and left side surfaces of the container.

If the cut-away portions and excisable portions are provided in the upper and lower surfaces or the right and left side surfaces of the container, it will not be necessary to select the direction in which the container is mounted and erroneous mounting will not occur at all.

Also, where a plurality of colors of ink is used, there will occur a difference in the quantity of cartridges required between the ink which is consumed more and the ink which is consumed less, but if the structure as described above is adopted, loading of ink may be effected by the use of the same container in accordance with the quantity of cartridges required and therefore, there will not arise an inconvenience that a cartridge filled with a particular color of ink remains unused.

Although the above-described embodiment has been shown with respect only to an example applied to ink cartridges, the substance filling the container is not limited to ink, but may be a plurality of different kinds of substances such as other liquids and powdered materials.

According to the present invention, as has been described above in detail, there is provided an ink jet recording apparatus in which owing to the presence of the check valve, the electromagnetic valves need not be operated except during the ink non-discharge recovery operation and the sequence control is remarkably simplified and the consumed electric power is markedly decreased and generated heat can also be reduced.

Also, according to the present invention, there can be provided an electromagnetic valve of which the opening-closing is automatically effected during the mounting and dismounting of the head unit and to which electric power can be supplied to close the valve only when required and which consumes a small amount of electric power and generates a small amount of heat, and there is provided an ink supply device having a valve device in which no back flow of ink or the like will occur even if the pressure on the head unit side fluctuates, and an ink jet recording apparatus having such ink supply device.

Further, according to the present invention, the liquid sent little by little from the tube is successively absorbed by the ink absorbing member, but when a great amount of liquid has been sent due to an accident or the like, the speed of rising of the liquid level is higher than the speed of ink absorption of the absorbing member and in this connection, there is provided an ink supply device having an overflow sensor which is capable of detecting the overflow state immediately at an early stage thereof to thereby enable an emergent step to be taken on the apparatus side and which can of course detect even the overflow level reached by slight amounts of liquid in a long time, and an ink jet recording apparatus having such ink supply device.

Furthermore, according to the present invention, there is provided an ink supply device having a water hammer absorbing damper which can absorb, by the resilient force of a tube, the pressure of water hammer when it occurs and can prevent the pressure of water hammer from affecting the head side, and an ink jet recording apparatus having such ink supply device.

According to the present invention, there is provided an ink supply device having a check valve which eliminates the leakage of liquid during the mounting and dismounting because of a structure in which the valve and the cartridge are connected together and the flow paths are communicated with each other after the seal has been completed and the seal of the joint portion comes off after the flow paths have been closed, and an ink jet recording apparatus having such ink supply device.

According to the present invention, a number of kinds of ink containers can be molded by the use of a small number of kinds (for example, one kind) of metal mold to thereby realize reduced cost and also, there can be provided an ink container in which if an excisable portion lying at a particular location is adapted to be excised during the loading of a particular color of ink, the excised portion will become a cut-away portion corresponding to the particular color and thereby any artificial mistake such as wrong selection of containers can be completely prevented.

Numerous modifications are conceivable within the scope of the present invention, and it should be understood that those modifications are also covered by the present invention.

What is claimed is:

1. An ink jet recording apparatus comprising:

a head element for discharging ink and effecting recording, a recording flow path for communicating said head element with one end of a first ink tank, a pump side flow path for communicating the first ink tank with said head element through a pump and, together with said recording flow path, providing an ink circulation path through said head element and the first ink tank, first and second normally open electrical opening-closing means provided respectively in said recording flow path and in a tube for opening the first ink tank to atmosphere, and third normally open electrical opening-closing means and a check valve for permitting the passage of ink from the pump only to said head element, wherein said third opening-closing means and said check valve are interposed in series in said pump side flow path between the pump and said head element.

2. An ink jet recording apparatus according to claim 1, further comprising an absorbing member for absorbing a small amount of ink leakage provided at the outer end of the tube, a pair of electrodes short-circuited through the ink in the case of a great amount of ink leakage, and an overflow sensor for functioning as a breather.

3. An ink jet recording apparatus according to claim 2, wherein a trap lid is disposed on top of said absorbing member.

4. An ink jet recording apparatus according to claim 2, wherein said overflow sensor is formed with an air hole having a breather film which effects the discharge and suction of air when the pressure in a container reaches a predetermined level.

5. An ink jet recording apparatus according to claim 1, wherein all of said normally open electrical opening-closing means include a valve imparting a force in a direction to close the flow path, a pivotable lever imparting a force in a direction to open said valve, a solenoid adapted to attract said pivotable lever in a direction for closing said valve when energized and a lock lever for pivotally moving said pivotable lever in a direction to close said valve in the absence of extraneous force thereto.

6. An ink jet recording apparatus according to claim 1, further comprising an ink supply flow path communicating with said pump side flow path and an ink container, wherein:

operation of the pump sucks ink from the ink container and supplies ink to the first ink tank, and said ink supply flow path includes a first valve adapted to be opened only when ink is sucked from the ink container and a second valve adapted to be opened and closed only when the ink container is mounted or dismounted and the space between said second valve and the ink container is sealed, said first and second valves being disposed in series.

7. An ink jet recording apparatus according to claim 6, wherein said first valve is a diaphragm valve acting to normally close a through-hole provided in said ink supply flow path.

8. An ink jet recording apparatus according to claim 1, wherein a water hammer absorbing damper having a closed tube sufficiently resilient to absorb water hammer is connected in said pump side flow path.

9. An ink jet recording apparatus according to claim 8, wherein said closed tube is provided at one end of a T-tube provided in said pump side flow path.

10. An ink jet recording apparatus according to claim 8, wherein said closed tube is closed by a plug.

11. An ink jet recording apparatus according to claim 1, wherein the first ink tank can be supplied with ink from a removable second ink tank comprising an ink container having a plurality of cut-away portions formed at predetermined intervals in the peripheral wall at one end of the container, and openings on the same axis at a predetermined distance from said cut-away portions along the direction in which the container is mounted, the portion of the peripheral wall which is between said cut-away portions and said openings providing an excisable portion.

12. An ink supply device having an overflow sensor comprising:

a container having an air hole at a portion of the upper surface thereof, a liquid absorbing member filling said container to a predetermined level, a liquid supplying tube connected while communicating with a space above said absorbing member, and liquid level detecting means projecting from the upper surface of said container toward the internal space in said container.

13. An ink supply device according to claim 12, wherein a trap lid is placed on top of said absorbing member.

14. An ink supply device according to claim 12, wherein a breather film which effects the discharge and suction of air when the pressure in said container reaches a predetermined level is provided in said air hole.

15. An ink supply device according to claim 12, wherein said liquid level detecting means comprises a plurality of electrodes.

16. An ink jet recording apparatus having an ink supply device comprising:

a container having an air hole at a portion of the upper surface thereof, a liquid absorbing member filling said container to a predetermined level, a liquid supplying tube connected while communicating with a space above said absorbing member, and liquid level detecting means projecting from the upper surface of said container toward the internal space in said container.

17. An overflow sensor comprising:

a container having an air hole at a portion of the upper surface thereof, a liquid absorbing member filling said container to a predetermined level, a liquid supplying tube connected while communicating with a space above said absorbing member, and liquid level detecting means projecting from the upper surface of said container toward the internal space in said container.

18. An overflow sensor according to claim 17, wherein a trap lid is placed on top of said absorbing member.

19. An overflow sensor according to claim 17, wherein a breather film which effects the discharge and suction of air when the pressure in said container reaches a predetermined level is provided in said air hole.

20. An overflow sensor according to claim 17, wherein said liquid level detecting means comprises a plurality of electrodes.

21. An ink supply device having a valve device comprising:

a valve imparting a force in a direction to close a flow path, a pivotable lever imparting a force in a direction to open said valve, a solenoid for attracting said pivotable lever in a direction for closing said valve when energized, and a lock lever for pivotally moving said pivotable lever in a direction to close said valve in the absence of extraneous force applied thereto.

22. An ink supply device according to claim 21, wherein the intermediate portion of the valve rod of said valve is sealed by a diaphragm.

23. An ink jet recording apparatus having an ink supply device comprising:

a valve imparting a force in a direction to close a flow path, a pivotable lever imparting a force in a direction to open said valve, a solenoid for attracting said pivotable lever in a direction for closing said valve when energized, and a lock lever for pivotally moving said pivotable lever in a direction to close said valve in the absence of extraneous force applied thereto.

24. A valve device comprising:

a valve imparting a force in a direction to close a flow path, a pivotable lever imparting a force in a direction to open said valve, a solenoid for attracting said pivotable lever in a direction for closing said valve when energized, and a lock lever for pivotally moving said pivotable lever in a direction to close said valve in the absence of extraneous force applied thereto.

25. A valve device according to claim 24, wherein the intermediate portion of the valve rod of said valve is sealed by a diaphragm.

26. An ink container comprising:

a plurality of cut-away portions formed at predetermined intervals in the peripheral wall of the container, and openings on the same axis at a predetermined distance from said cut-away portions along the direction in which the container is mounted, wherein the portion of the peripheral wall which is between said cut-away portions and said openings provides an excisable portion.

27. An ink container according to claim 26, wherein said excisable portion is excised when ink is poured into the ink container.

28. An ink supply device having an ink container comprising:

a plurality of cut-away portions formed at predetermined intervals in the peripheral wall of the container, and openings on the same axis at a predetermined distance from said cut-away portions along the direction in which the container is mounted, wherein the portion of the peripheral wall which is between said cut-away portions and said openings provides an excisable portion.

29. An ink jet recording apparatus an ink container comprising:

a plurality of cut-away portions formed at predetermined intervals in the peripheral wall of the container, and openings on the same axis at a predetermined distance from said cut-away portions along the direction in which the container is mounted, wherein the portion of the peripheral wall which is between said cut-away portions and said openings provides an excisable portion.

* * * * *

CERTIFICATE OF CORRECTION

PATENT NO. : 4,737,801

DATED : April 12, 1988

INVENTOR(S) : HIROO ICHIHASHI, ET AL.

It is certified that error appears in the above-identified patent and that said Letters Patent is hereby corrected as shown below:

COLUMN 3

Line 49, "said" should read --side--.

COLUMN 4

Line 33, "thereb y" should read --thereby--.

COLUMN 5

Line 7, "signal" should read --single--.
Line 23, "a" should read --the--.
Line 45, "only" should read --also--.
Line 53, "suppy" should read --supply--.

COLUMN 6

Line 46, "close" should read --closed--.

COLUMN 7

Line 28, "fregmentary" should read --fragmentary--.
Line 32, "EMBODIMENT" should read --EMBODIMENTS--.
Line 35, "an" should be deleted.
Line 48, "so" should read --as--.

COLUMN 8

Line 66, "JBA 33" should read --BJA 33--.

UNITED STATES PATENT AND TRADEMARK OFFICE

CERTIFICATE OF CORRECTION

PATENT NO. : 4,737,801

DATED : April 12, 1988
INVENTOR(S) : HIROO ICHIHASHI, ET AL.

It is certified that error appears in the above-identified patent and that said Letters Patent is hereby corrected as shown below:

COLUMN 9

Line 6, "malled" should read --nalled--.
Line 33, "cross-sectionl" should read --cross-sectional--.
Line 43, "members 4447" should read --members 44-47--.

COLUMN 10

Line 8, "which communicates the connecting cylinder 7b" should be deleted.

COLUMN 11

Line 49, "th" should read --the--.

COLUMN 12

Line 13, "abosrbing" should read --absorbing--.
Line 64, "emergent" should read --emergency--.

COLUMN 13

Line 11, "embodiments" should read --embodiment--.
Line 28, "value" should read --valve--.
Line 40, "small-diametered portion 1316." should read --small-diametered portion 1316a.--.
Line 61, "tridges" should read --tridge--.

CERTIFICATE OF CORRECTION

PATENT NO. : 4,737,801
DATED : April 12, 1988
INVENTOR(S) : HIROO ICHIHASHI, ET AL.

It is certified that error appears in the above-identified patent and that said Letters Patent is hereby corrected as shown below:

COLUMN 15

Line 19, "upper unit" should read --upper unit 20--.
Line 62, "passes" should read --and passes--.

COLUMN 16

Line "cap 3" should read --cap 34--.

COLUMN 18

Line 30, "a time" should read --at the same time--.

COLUMN 19

Line 47, "emergent" should read --emergency--.

COLUMN 20

Line 62, "force thereto." should read --force applied thereto.--

UNITED STATES PATENT AND TRADEMARK OFFICE
CERTIFICATE OF CORRECTION

PATENT NO. : 4,737,801 
DATED : April 12, 1988
INVENTOR(S) : HIROO ICHIHASHI, ET AL.

It is certified that error appears in the above-identified patent and that said Letters Patent is hereby corrected as shown below:

COLUMN 24

Line 3, "apparatus an ink" should read --apparatus having an ink--.

Signed and Sealed this

Twenty-eighth Day of March, 1989

Attest:

DONALD J. QUIGG

*Attesting Officer* *Commissioner of Patents and Trademarks*